United States Patent
Mizushima et al.

(10) Patent No.: US 11,021,184 B2
(45) Date of Patent: Jun. 1, 2021

(54) STEERING RACK AND METHOD FOR MANUFACTURING THE SAME

(71) Applicant: NSK LTD., Tokyo (JP)

(72) Inventors: Yuuki Mizushima, Fujisawa (JP); Nobuyuki Hagiwara, Fujisawa (JP); Kazuto Kobayashi, Fujisawa (JP)

(73) Assignee: NSK LTD., Tokyo (JP)

( * ) Notice: Subject to any disclaimer, the term of this patent is extended or adjusted under 35 U.S.C. 154(b) by 297 days.

(21) Appl. No.: 16/160,139

(22) Filed: Oct. 15, 2018

(65) Prior Publication Data

US 2019/0047609 A1  Feb. 14, 2019

Related U.S. Application Data

(62) Division of application No. 15/113,204, filed as application No. PCT/JP2015/051458 on Jan. 21, 2015, now Pat. No. 10,392,046.

(30) Foreign Application Priority Data

Jan. 22, 2014 (JP) ................... 2014-009670

(51) Int. Cl.
*B62D 3/12* (2006.01)
*F16H 19/04* (2006.01)
(Continued)

(52) U.S. Cl.
CPC .............. *B62D 3/126* (2013.01); *B21K 1/767* (2013.01); *F16H 19/04* (2013.01); *F16H 55/26* (2013.01)

(58) Field of Classification Search
CPC ......... B62D 3/126; F16H 55/26; F16H 19/04; B21K 1/767; Y10T 29/49462; Y10T 29/49467; Y10T 29/49474
(Continued)

(56) References Cited

U.S. PATENT DOCUMENTS 4,133,221 A   1/1979 Clary
4,641,406 A   2/1987 Rogers
(Continued)

FOREIGN PATENT DOCUMENTS

CN   1791696 A    6/2006
CN   101547759 A  9/2009
(Continued)

OTHER PUBLICATIONS

Extended European Search Report dated Aug. 21, 2017 by the European Patent Office in European Patent Application No. 15740585.3.

(Continued)

*Primary Examiner* — Sarang Afzali
*Assistant Examiner* — Darrell C Ford
(74) *Attorney, Agent, or Firm* — Sughrue Mion, PLLC

(57) ABSTRACT

A steering rack (11*a*) meshes with a pinion rotatably driven by the input shaft (6) of a steering gear (5) constituting an automotive steering device. The steering rack (11*a*) is provided with a an axially extending rod part (15) of round cross section, and a plurality of rack teeth (16) formed on a radial one side surface of an axial portion of the rod part (15), the rack teeth (16) meshing with the pinion. At least one dummy tooth (42) is formed in portions that are axial parts of the rod part (15) and are adjacent to both axial sides of the plurality of rack teeth (16). The dummy tooth (42) has a tooth height less than the rack teeth (16) and does not mesh with the pinion.

1 Claim, 14 Drawing Sheets

(51) Int. Cl.
*B21K 1/76* (2006.01)
*F16H 55/26* (2006.01)

(58) Field of Classification Search
USPC .......... 29/893.34, 893.3, 893; 74/29, 89.17, 74/109, 422, 457
See application file for complete search history.

(56) References Cited

U.S. PATENT DOCUMENTS

| | | | |
|---|---|---|---|
| 9,328,815 B2 | 5/2016 | Nomura et al. | |
| 2002/0044439 A1 | 4/2002 | Shiokawa | |
| 2002/0174702 A1* | 11/2002 | Yasuda | B21D 53/28 72/370.06 |
| 2007/0079643 A1* | 4/2007 | Dohmann | B62D 3/126 72/353.2 |
| 2007/0113698 A1 | 5/2007 | Ohta et al. | |
| 2008/0010830 A1* | 1/2008 | Okada | B21K 1/305 29/893.3 |
| 2009/0260467 A1* | 10/2009 | Kobayashi | B62D 3/126 74/422 |
| 2009/0301245 A1* | 12/2009 | Eckstein | B62D 3/126 74/422 |
| 2010/0162843 A1 | 7/2010 | Kobayashi et al. | |
| 2011/0204588 A1 | 8/2011 | Yang et al. | |
| 2012/0186085 A1 | 7/2012 | Kobayashi et al. | |
| 2013/0340554 A1 | 12/2013 | Nomura et al. | |
| 2015/0000135 A1* | 1/2015 | Oumi | B62D 3/126 29/893.34 |
| 2015/0276037 A1* | 10/2015 | Yamawaki | F16H 55/26 74/640 |
| 2016/0001352 A1* | 1/2016 | Hagiwara | B21J 13/025 74/422 |
| 2018/0128363 A1* | 5/2018 | Hagiwara | F16H 55/26 |
| 2018/0221938 A1* | 8/2018 | Mizutani | B21K 1/76 |

FOREIGN PATENT DOCUMENTS

| | | |
|---|---|---|
| DE | 2458320 A1 | 6/1976 |
| DE | 102 58 807 A1 | 7/2004 |
| DE | 10 2010 032 401 A1 | 2/2012 |
| EP | 2 676 865 A2 | 12/2013 |
| JP | 57-73268 A | 5/1982 |
| JP | 10-58081 A | 3/1998 |
| JP | 2001-79639 A | 3/2001 |
| JP | 3442298 B2 | 9/2003 |
| JP | 2006-103644 A | 4/2006 |
| JP | 2007-253190 A | 10/2007 |
| JP | 2008-137473 A | 6/2008 |
| JP | 2008-138864 A | 6/2008 |
| JP | 2013-97519 A | 5/2013 |
| JP | 2014-5839 A | 1/2014 |

OTHER PUBLICATIONS

International Search Report, issued by International Searching Authority in corresponding International Application No. PCT/JP2015/051458, dated Apr. 14, 2015. (PCT/ISA/210).

Office Action dated May 3, 2017 by the State Intellectual Property Office of P.R. China in counterpart Chinese Patent Application No. 201580005152.3.

Written Opinion, issued by International Searching Authority in corresponding International Application No. PCT/JP2015/051458, dated Apr. 14, 2015. (PCT/ISA/237).

Communication dated Nov. 1, 2018, issued by the United States Patent and Trademark Office in counterpart U.S. Appl. No. 15/113,204.

* cited by examiner

STEERING RACK AND METHOD FOR MANUFACTURING THE SAME

TECHNICAL FIELD

The present invention is a divisional of U.S. application Ser. No. 15/113,204 filed on Jul. 21, 2016 which relates to a steering rack and a method for manufacturing the same.

RELATED ART

For example, as shown in FIG. 10, an automotive steering device configured to apply a steering angle to steering wheels of an automobile (generally, front wheels except for a special vehicle such as a forklift) is configured to transmit movement of a steering shaft 2 configured to rotate in accordance with an operation of a steering wheel 1 to an input shaft 6 of a steering gear 5 via universal joints 3, 3 and an intermediate shaft 4. The steering gear 5 has a pinion configured to rotate by the input shaft 6 and a steering rack configured to mesh with the pinion. When the pinion rotates together with the input shaft 6, the steering rack is axially displaced to push and pull a pair of tie-rods 7, 7 coupled to both end portions thereof, thereby applying a desired steering angle to the steering wheels.

Also, a gear housing 9 is coupled to a lower end of a steering column 8 in which the steering shaft 2 is inserted. The gear housing 9 is configured to support an electric motor 10. By the electric motor 10, an auxiliary force of a rotating direction is applied to the steering shaft 2.

Meanwhile, in addition to the column-assisted electric power steering device shown in FIG. 10, electric power steering devices called as a pinion-assisted type, a dual pinion-assisted type and a rack-assisted type have been used. FIG. 11 depicts a steering device in which a dual pinion-assisted power steering device is incorporated. The steering device has a second input shaft 12 arranged at a part that is an axial part of a steering rack 11 and is spaced from a pinion provided on an outer periphery of the input shaft 6. A second pinion provided on an outer periphery of one end portion of the second input shaft 12 is configured to mesh with the steering rack 11. Also, an electric motor 10a is supported to a lateral side of a housing 13 in which the second input shaft 12 is provided. By the electric motor 10a, a force of a rotating direction is applied to the second input shaft 12 via a decelerator 14. Therefore, the steering rack 11 is axially displaced by a force based on the auxiliary force and a force applied from the input shaft 6 on the basis of a force applied to the steering wheel 1 by a driver.

In the shown example, a plurality of rack teeth is axially provided on a radial one side surface of the steering rack 11, except for both end portions coupled to the pair of tie-rods 7, 7 (refer to FIG. 10). A pitch of the pinion provided on the outer periphery of the input shaft 6 and a pitch of the second pinion provided on the outer periphery of the one end portion of the second input shaft 12 can be made to be different from each other can be made to be different from each other. An angle between a central axis of the input shaft 6 and a central axis of the steering rack 11 and an angle between a central axis of the second input shaft 12 and the central axis of the steering rack 11 can be made to be different from each other.

When the rack for the steering gear is made by performing cutting processing for a material to form a plurality of rack teeth, the manufacturing cost increases and it is difficult to secure the strength and stiffness of the rack. In contrast, when the rack teeth are formed by plastically deforming a material by cold forging, it is possible to shorten time necessary for processing of the rack teeth and to reduce the manufacturing cost because it is not necessary to perform finishing processing after the quenching. Also, since a metal structure of the obtained rack is dense and a sectional shape of the rack can be deformed upon the plastic deformation, as required, it is easy to secure the strength and stiffness of the rack. The steering rack manufacturing method of processing the rack teeth by the cold forging in this way has been known in Patent Documents 1 to 5, for example.

FIGS. 12 to 17 depict an example of a steering rack and a method for manufacturing the same disclosed in Patent Document 5. A steering rack 11a has a rod part 15 made of a metal material such as carbon steel, stainless steel or the like and having a round cross section and a plurality of rack teeth 16 formed on a radial one side surface of a part in the axial direction (a left part in FIGS. 12 to 14) of the rod part 15 by plastic processing. The rod part 15 is integrally formed over its entire length by the metal material. Herein, a part in the axial direction of the rod part 15 and is spaced circumferentially from a part on which the plurality of rack teeth 16 is formed is referred to as a backside part 17. In the shown example, a radius of curvature $R_{17}$ (refer to FIG. 15) of the cross section of the backside part 17 is made greater than a radius of curvature $r_{18}$ (refer to FIG. 15) of an outer periphery of a cylindrical part 18, which is the other part in the axial direction (a right part in FIGS. 12 to 14) of the rod part 15 ($R_{17} > r_{18}$). According to this structure, while sufficiently securing a width size, stiffness and strength of the rack teeth 16, it is possible to suppress an outer diameter of a part except for the part on which the rack teeth 16 is formed from increasing beyond necessity, thereby reducing a weight.

Subsequently, a manufacturing method of the above-described steering rack 11a is described with reference to FIGS. 16 to 18. First, as shown in FIG. 16A, a cylindrical material 19 made of a metal material such as carbon steel, stainless steel or the like is set (placed) in a concave groove portion 21 provided on an upper surface of a receiving die 20 and having an arc-shaped cross section. Then, as shown in FIG. 16B, mounting processing of strongly pressing the material 19 toward the concave groove portion 21 by a tip surface (lower end surface) of a pressing punch 22, which is long along the concave groove portion 21, is performed. In the mounting processing shown in FIG. 16B, a part in an axial direction of the material 19 on which the rack teeth 16 (refer to FIGS. 12 to 15) are to be formed is crushed in a vertical direction and a width size in a horizontal direction is increased, so that an intermediate material 23 is formed. The intermediate material 23 has, on its outer periphery, a partially cylindrical surface part 24 which is to be the backside part 17 (refer to FIGS. 12, 14 and 15), a flat surface part 25 located at an opposite side to the partially cylindrical surface part 24 with respect to a radial direction of the cross section, and a pair of curved surface parts 26, 26 configured to continuously connect the partially cylindrical surface part 24 and the flat surface part 25 and having a relatively small radius of curvature.

Subsequently, as shown in FIG. 16C, the intermediate material 23 is pulled out from the concave groove portion 21 of the receiving die 20 and is inserted (set) into a bottom 29 of a holding hole 28 provided to a die 27. A radius of curvature of the bottom 29 is substantially the same as a radius of curvature of an inner surface of the concave groove portion 21 of the receiving die 20. Also, both inner surfaces 30, 30 are planar surfaces parallel with each other. Further, upper openings are provided with a pair of inclined guide surface portions 31, 31, which are inclined in a direction in which an interval therebetween gradually increases toward the above.

When the intermediate material 23 is set in the holding hole 28 of the die 27, a tooth-forming punch 32 is inserted into the holding hole 28 and the intermediate material 23 is strongly pushed into the holding hole 28 by the tooth-forming punch 32, as shown in FIGS. 16C and 16D. A processing surface (lower surface) of the tooth-forming punch 32 is provided with a rack tooth processing concave and convex 40 having a shape corresponding to the rack teeth 16 to be formed. Also, the outer periphery of the intermediate material 23 is restrained by the inner surfaces of the holding hole 28, except for the flat surface part 25 on which the rack teeth 16 are to be formed. For this reason, when the intermediate material 23 is strongly pushed into the holding hole 28 by the tooth-forming punch 32, the flat surface part 25 of the intermediate material 23 is plastically deformed in conformity to the rack tooth processing concave and convex 40, so that the intermediate material is processed into a base rack 33 having rack teeth 16 as shown in FIGS. 16D and 17A. At this state, the base rack 33 is insufficient in terms of shape accuracy and size accuracy, as compared to the completed steering rack 11a (refer to FIGS. 12 to 15), and end edges of the rack teeth 16 are sharp. Also, since the excess thickness extruded (from portions to be tooth bottoms) as the rack teeth 16 are processed is strongly pressed to both inner surfaces 30, 30 of the holding hole 28, relief flat surface parts 34, 34 parallel with each other are formed on both left and right side surfaces of the base rack 33.

Therefore, after uplifting the tooth-forming punch 32, the base rack 33 is pulled out from the holding hole 28, and is placed on a sizing concave and convex surface part 36 formed on an upper surface of a sizing die 35, as shown in FIG. 16E. At this time, the base rack 33 is vertically inverted. The sizing concave and convex surface part 36 has a shape (an concave and convex is inverted with respect to a completed shape) corresponding to the shape of the rack teeth 16 to be obtained, including chamfered portions of end edges of the teeth. Then, as shown in FIGS. 16E and 16F, the part of the base rack 33 having the rack teeth 16 formed thereon is strongly pressed toward the sizing concave and convex surface part 36 by a press die 37.

A lower surface of the press die 37 is formed with a pressing concave groove 38 having a radius of curvature coinciding with the radius of curvature $R_{17}$ (refer to FIG. 15) of the backside part 17 of the completed steering rack 11a. The base rack 33 is strongly pressed toward the sizing concave and convex surface part 36 at a state where a part to be the backside part 17 is fitted in the pressing concave groove 38. As a result, at a state (FIG. 16F) where the sizing die 35 and the press die 37 are sufficiently brought close to each other, the rack teeth 16 are in a completed state shown in FIG. 17B (a state where a shape and a size are appropriate and an end edge of each tooth is chamfered) and the backside part 17 also has appropriate shape and size. In the meantime, the excess thickness extruded by performing the sizing is collected at both relief flat surface parts 34, 34. Therefore, both relief flat surface parts 34, 34 little remain in the completed steering rack 11a. However, since the excess thickness does not extremely strongly press the inner surfaces of the sizing concave and convex surface part 36 or the pressing concave groove 38, it is possible to suppress the processing load of the sizing as low as possible and to easily secure the durability of the sizing die 35 and the press die 37.

PRIOR TECHNICAL DOCUMENTS

Patent Documents

Patent Document 1: Japanese Patent Application Publication No. H10-58081A
Patent Document 2: Japanese Patent Application Publication No. 2001-79639A
Patent Document 3: Japanese Patent No. 3,442,298B
Patent Document 4: Japanese Patent Application Publication No. 2006-103644A
Patent Document 5: Japanese Patent Application Publication No. 2008-138864A

SUMMARY OF THE INVENTION

Problems to be Solved

According to the manufacturing method of the steering rack of the related art, including the manufacturing method disclosed in Patent Document 5, following problems may occur. As described above, when the intermediate material 23 is strongly pushed into the holding hole 28 by the tooth-forming punch 32, the flat surface part 25 of the intermediate material 23 is plastically deformed in conformity to the rack tooth processing concave and convex 40 of the tooth-forming punch 32 and is processed into the base rack 33 having the rack teeth 16 (refer to FIG. 18).

Herein, as shown in FIG. 19 (corresponding to an area A surrounded by the broken line of FIG. 18), a tooth 39 of the tooth-forming punch 32 configured to form a rack tooth 16, which is adjacent to an intermediate part in the axial direction, of a plurality of teeth 39 configuring the rack tooth processing concave and convex 40 of the tooth-forming punch 32 is applied with equivalent forces $f_1$ from the rack teeth 16 of both axial sides at the same tooth height. In contrast, as shown in FIG. 20 (corresponding to an area B surrounded by the broken line of FIG. 18), a tooth 39 of the tooth-forming punch 32 configured to form both ends of a rack tooth 16 in the axial direction (in FIGS. 18 and 20, only one end of the rack tooth 16 in the axial direction is shown) and positioned at an axially outer side of the corresponding rack tooth 16 is applied with the force $f_1$ from the rack tooth 16 placed in an axially inner side of the tooth 39. For this reason, the moments applied from both axial sides are unbalanced, bending occurs in the tooth 39 of the tooth-forming punch 32, stress is concentrated on a corner of a root of the tooth 39, strong tensile force is thus generated, and the lifetime of the tooth-forming punch 32 may be shortened. In the worst case, a crack C is generated at the corner of the root of the tooth 39, so that the tooth may be fractured.

The present invention has been made in view of the above situations, and an object of the present invention is to provide a steering rack and a method for manufacturing the same capable of implementing a long lifetime of a tooth-forming punch when cold forging is performed.

Means for Solving the Problems

The above object of the present invention is achieved by following configurations.
(1) A steering rack configured to mesh with a pinion configured to be rotationally driven by an input shaft of a steering gear configuring an automotive steering device, wherein
the steering rack has a rod part extending in an axial direction and having a round cross section and a plurality of rack teeth formed on a radial one side surface of a part of the rod part in the axial direction and configured to mesh with the pinion, and at least one dummy tooth having a tooth height less than the rack teeth and configured not to mesh with the pinion is formed at parts that are the parts of the rod part in the axial direction and are adjacent to both axial sides of the plurality of rack teeth.

(2) In the steering rack of (1), wherein
the dummy tooth has an axially inner surface and an axially outer surface configured to be inclined in a direction of axially coming close to each other as they go toward a radially outer side, and a radially outer surface configured to connect the axially inner surface and the axially outer surface, and a pair of connection parts between the axially inner surface and the radially outer surface and between the axially outer surface and the radially outer surface has an R shape.

(3) In the steering rack of (2), wherein
the n (n: natural number) dummy teeth are formed at the parts that are the parts of the rod part in the axial direction and are adjacent to both axial sides of the plurality of rack teeth, each of the rack teeth has an axially inner surface and an axially outer surface configured to be inclined in a direction of axially coming close to each other as they go toward a radially outer side, and a radially outer surface configured to connect the axially inner surface and the axially outer surface, and when an inclined angle of the axially outer surface, which is adjacent to the dummy tooth, of the rack tooth, which is positioned at each of both axial ends, of the plurality of rack teeth is denoted as $\theta_1$, inclined angles of the axially inner surfaces of the plurality of dummy teeth are denoted as $\theta_2, \theta_4, \ldots, \theta_{2n}$ in order from first to $n^{th}$ dummy teeth close to the rack tooth, and inclined angles of the axially outer surfaces of the plurality of dummy teeth are denoted as $\theta_3, \theta_5, \ldots, \theta_{2n+1}$ in order from the first to $n^{th}$ dummy teeth close to the rack tooth, the inclined angles are set so that a relation of $\theta_1 < \theta_2 \leq \theta_3 < \theta_4 \leq \theta_5 < \ldots < \theta_{2n} \leq \theta_{2n+1}$ is satisfied.

(4) In the steering rack of (3), wherein
when a tooth height of the rack tooth positioned at each of both ends in the axial direction is denoted as $H_1$ and tooth heights of the plurality of dummy teeth are denoted as $H_3, H_5, \ldots, H_{2n+1}$ in order from the first to $n^{th}$ dummy teeth, the tooth heights are set so that a relation of $H_1 > H_3 > H_5 > \ldots > H_{2n+1}$ is satisfied.

(5) In the steering rack of (4), wherein
when a half value of the tooth height of the rack tooth positioned at each of both ends in the axial direction is denoted as $L_1$ and half values of the tooth heights $H_3$, $H_5, \ldots, H_{2n+1}$ of the first to $n^{th}$ dummy teeth are denoted as $L_3, L_5, \ldots, L_{2n+1}$, a relation of $L_2 = H_1 - L_3$, $L_4 = H_3 - L_5, \ldots, L_{2n} = H_{2n-1} - L_{2n-1}$ is satisfied, and when a force, which is to be generated on the axially outer surface of the rack tooth positioned at each of both ends in the axial direction toward an axially outer side at a position of $L_1$ distant from a radially outer end portion of the corresponding rack tooth toward a radially inner side, is denoted as $f_1$, a force, which is to be generated on the axially inner surface of the first dummy tooth toward an axially inner side at a position of $L_2$ distant from the radially outer end portion of the rack tooth positioned at each of both axial ends toward the radially inner side, is denoted as $f_2$, a force, which is to be generated on the axially outer surface of the $(n-1)^{th}$ dummy tooth toward the axially outer side at a position of $L_{2n-1}$ distant from the radially outer end portion of the $(n-1)^{th}$ dummy tooth toward the radially inner side, is denoted as $f_{2n-1}$, and a force, which is to be generated on the axially inner surface of the $n^{th}$ dummy tooth toward the axially inner side at a position of $L_{2n}$ distant from the radially outer end portion of the $(n-1)^{th}$ dummy tooth toward the radially inner side, is denoted as $f_{2n}$, a relation of $L_1 \times f_1 = L_2 \times f_2$, $L_3 \times f_3 = L_4 \times f_4, \ldots, L_{2n-1} \times f_{2n-1} = L_{2n} \times f_{2n}$ is satisfied.

(6) In the steering rack of any one of (1) to (5), wherein
the radially outer surface of the at least one dummy tooth is formed with at least one groove portion.

(7) In the steering rack of (6),
wherein the groove portion is formed in total of three or more on the plurality of dummy teeth having the same tooth height.

(8) A method of manufacturing a steering rack, comprising forming a plurality of rack teeth on a radial one side surface of a part of a rod part, which is extending in the axial direction and is made of a metal material, in an axial direction by pressing a tooth-forming punch having rack tooth processing concave and convex having a rack shape toward the radial one side surface and plastically deforming the radial one side surface, wherein the plurality of rack teeth is configured to mesh with a pinion configured to be rotationally driven by an input shaft of a steering gear configuring an automotive steering device, the tooth-forming punch has dummy tooth processing concave and convex of which a tooth height is less than the rack tooth processing concave and convex at parts adjacent to both axial sides of the rack tooth processing concave and convex, and at least one dummy tooth having a tooth height less than the rack teeth and configured not to mesh with the pinion is formed at parts that are the parts of the rod part in the axial direction and are adjacent to both axial sides of the plurality of rack teeth.

(9) In the method of (8), wherein
in the process of forming the rack teeth, axially outer surfaces of teeth positioned at both end parts of the tooth-forming punch in the axial direction are contacted to axially inner surfaces of the rod part.

(10) In the method of (9), wherein
the dummy tooth processing concave and convex has at least one protrusion, and a radially outer surface of the at least one dummy tooth is formed with at least one groove portion by the protrusion.

Effect of the Invention

The steering rack of the present invention is provided with the at least one dummy tooth, which has the tooth height less than the rack teeth and is configured not to mesh with the pinion, at the portions adjacent to both axial sides of the plurality of rack teeth configured to mesh with the pinion. Therefore, when forming the plurality of rack teeth on the steering rack by cold forging, the tooth of the tooth-forming punch configured to form the rack tooth of each of both axial ends and positioned at the axially outer side of the corresponding rack tooth is applied with the force from the rack tooth of the axially inner side and the force from the dummy tooth of the axially outer side. Therefore, since the balance of the moments to be applied to the teeth of the tooth-forming punch is improved, it is possible to prevent the stress from being concentrated on the teeth, thereby implementing the long lifetime of the tooth-forming punch.

DETAILED DESCRIPTION OF EMBODIMENTS

Hereinafter, a steering rack according to each embodiment of the present invention will be described in detail with reference to the drawings.

Figure 16A:
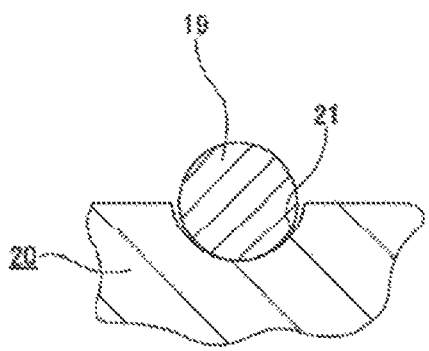
FIGS. 16A to 16F are sectional views as seen from the same direction as FIG. 15, depicting a method of manufacturing the steering rack relating to the conventional structure in a process sequence.
Figure 16B:
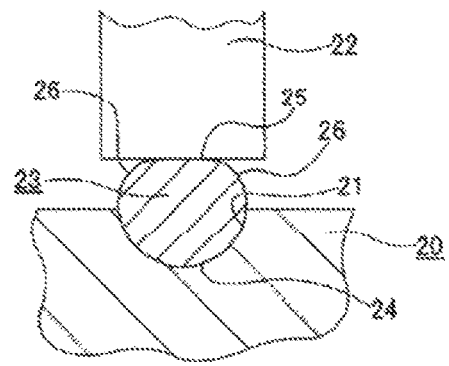
Figure 16C:
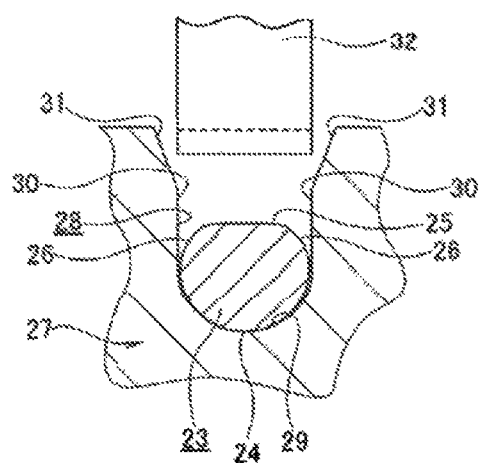
Figure 16D:
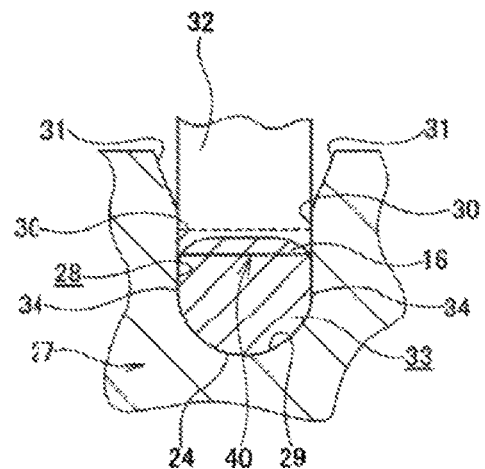
Figure 16E:
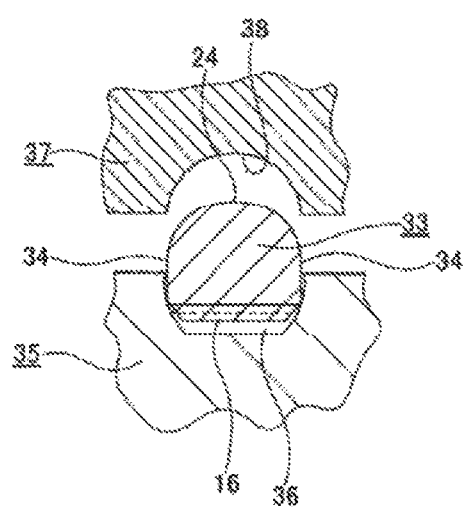
Figure 16F:
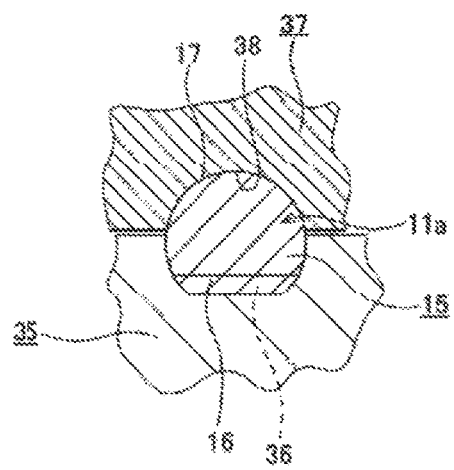
Figure 17A:
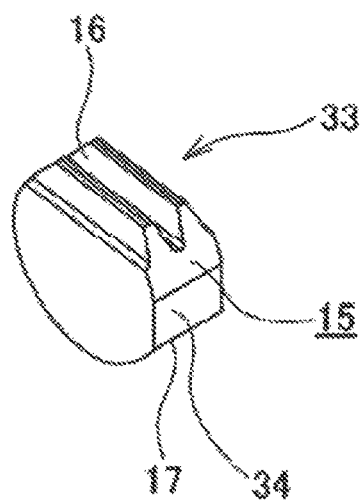
FIGS. 17A and 17B are partial perspective views depicting shapes of rack teeth before and after sizing.
Figure 17B:
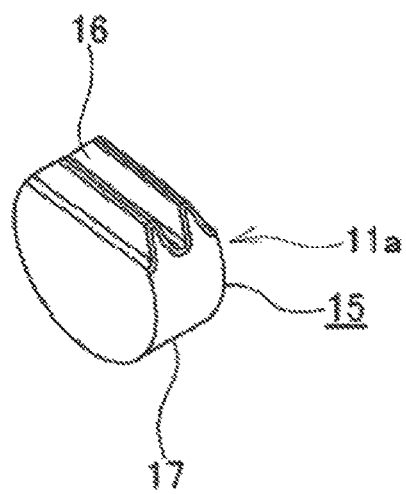
Figure 18:
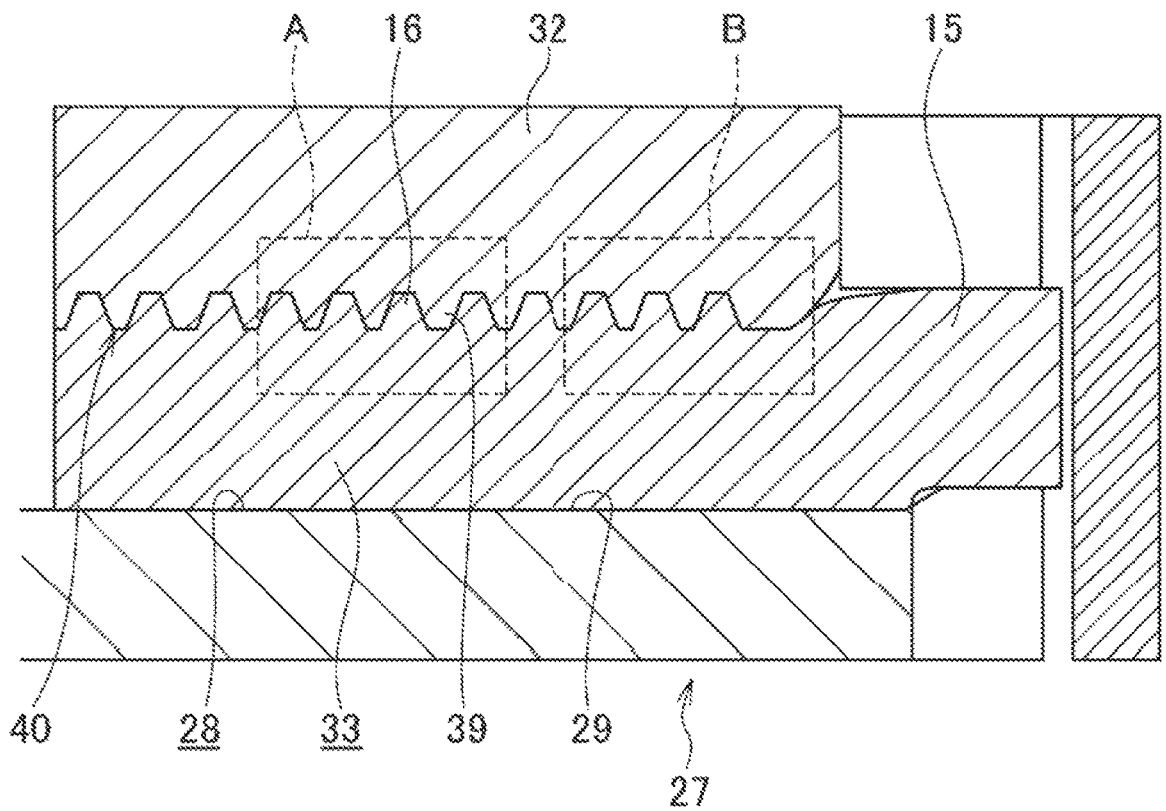
FIG. 18 is a sectional view for illustrating problems of a method and an apparatus for manufacturing the rack of the related art.
Figure 19:
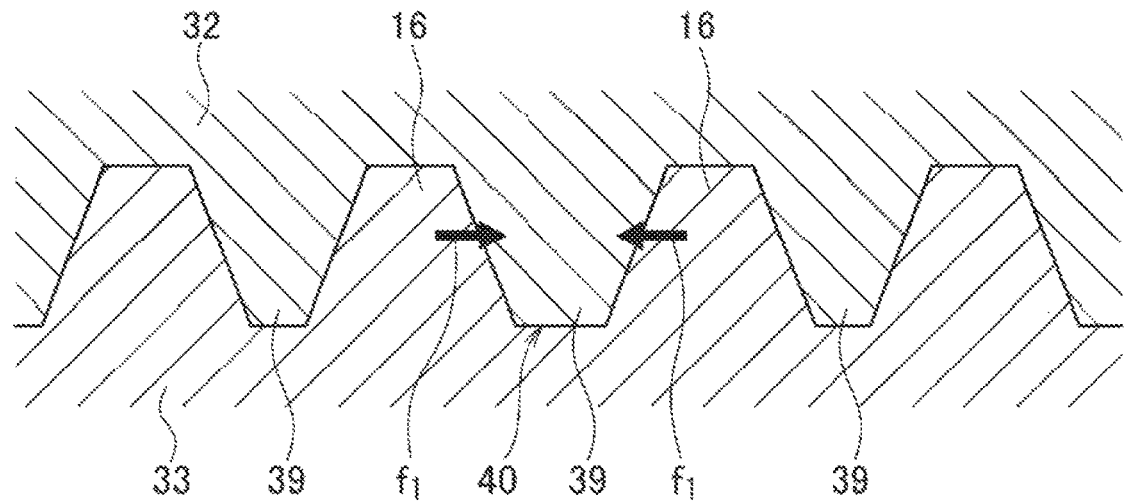
FIG. 19 is an enlarged sectional view corresponding to an area A of FIG. 18.

A steering rack and a method for manufacturing the same according to the present invention have features that when forming the rack teeth 16 on the radial one side surface of a part in the axial direction of the rod part 15 configuring the steering rack 11a (processes corresponding to FIGS. 16C and 16D described above), the stress is prevented from being concentrated on the teeth 39 of the tooth-forming punch 32 and the long lifetime of the tooth-forming punch 32 is thus implemented. Since the other configurations and operational effects are the same as the conventionally known steering rack manufacturing method and manufacturing apparatus, including the conventional manufacturing method and manufacturing apparatus shown in FIGS. 16 to 18, the illustration and description on the equivalent parts are omitted or simplified.

First Embodiment

Figure 1:
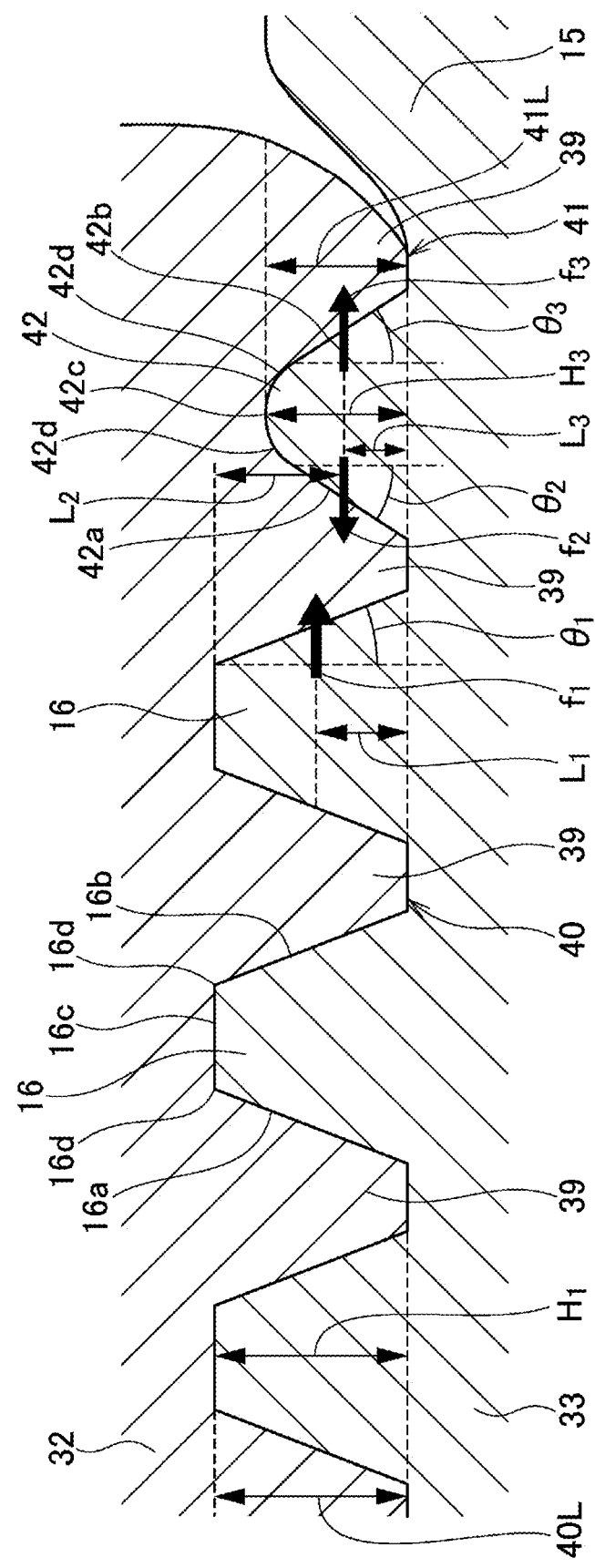
FIG. 1 depicts a rack and a tooth-forming punch according to a first embodiment of the present invention.

As shown in FIG. 1, a tooth-forming punch 32 of a first embodiment has not only the above-described rack tooth processing concave and convex 40 but also dummy tooth processing concave and convex 41 at parts adjacent to both axial sides of the rack tooth processing concave and convex 40 (in FIG. 1, only the dummy tooth processing concave and convex 41 on one side in the axial direction is shown). A tooth height 41L of the dummy tooth processing concave and convex 41 is formed less than a tooth height 40L of the rack tooth processing concave and convex 40.

Therefore, when strongly pushing the intermediate material 23 into the holding hole 28 by the tooth-forming punch 32 (processes corresponding to FIGS. 16C and 16D), the flat surface part 25 of the intermediate material 23 is plastically deformed in conformity to the rack tooth processing concave and convex 40 and the dummy tooth processing concave and convex 41 and is thus processed to a base rack 33 having rack teeth 16 and dummy teeth 42 as shown in FIG. 1.

More specifically, the base rack 33 has an axially extending rod part 15 having a round cross section and a plurality of rack teeth 16 formed on a radial one side surface of a part in the axial direction of the rod part 15 and configured to mesh with the pinion. A dummy tooth 42 is formed one by one at parts that are parts of the rod part 15 in the axial direction and are adjacent to both sides of the plurality of rack teeth 16 in the axial direction. Since a tooth height $H_3$ of the dummy tooth 42 is formed less than a tooth height $H_1$ of the rack tooth 16 ($H_3$=41L<$H_1$=40L), the dummy tooth 42 does not mesh with the pinion.

Also, the dummy tooth 42 has an axially inner surface 42a and an axially outer surface 42b configured to be inclined in a direction of axially coming close to each other as they go toward a radially outer side, and a radially outer surface 42c configured to connect the axially inner surface 42a and the axially outer surface 42b. The radially outer surface 42c is a curved surface having an R-shaped cross section of which an axially intermediate part is convex, and is configured to smoothly connect the axially inner surface 42a and the axially outer surface 42b. Therefore, a pair of connection parts 42d consisting of the axially inner surface 42a and axially outer surface 42b and the radially outer surface 42c also has an R shape. In the meantime, as described above, since the dummy tooth 42 is configured not to mesh with the pinion, there is no problem even when the radially outer surface 42c, which is a tooth tip, and the pair of connection parts 42d are made to have the R shape.

The rack tooth 16 has an axially inner surface 16a and an axially outer surface 16b configured to be inclined in the direction of axially coming close to each other as they go toward the radially outer side, and a radially outer surface 16c configured to connect the axially inner surface 16a and the axially outer surface 16b. Herein, since the rack tooth 16 is configured to mesh with the pinion, the radially outer surface 16c is formed to be a planar shape, and a pair of connection parts 16d between the axially inner surface 16a and the radially outer surface 16c and between the axially outer surface 16b and the radially outer surface 16c has an angled shape.

When an inclined angle of the axially outer surface 16b, which is adjacent to the dummy tooth 42, of the rack tooth 16 (the rack tooth 16 positioned at the rightmost side in FIG. 1), which is positioned at each of both axial ends, of the plurality of rack teeth 16 is denoted as $\theta_1$, an inclined angle of the axially inner surface 42a of the dummy tooth 42 is denoted as $\theta_2$, and an inclined angle of the axially outer surface 42b of the dummy tooth is denoted as $\theta_3$, the angles are set so that a relation of $\theta_1 < \theta_2 = \theta_3$ is satisfied.

Also, a half value of the tooth height $H_1$ of the rack tooth positioned at each of both axial ends is denoted as $L_1$ ($L_1 = 0.5 \times H_1$), a half value of the tooth height $H_3$ of the dummy tooth 42 is denoted as $L_3$ ($L_3 = 0.5 \times H_3$), and $L_2 = H_1 - L_3$ is denoted. In this case, a force $f_1$ is generated on the axially outer surface 16b of the rack tooth 16 positioned at each of both axial ends toward an axially outer side at a position of $L_1$ distant from a radially outer end part of the corresponding rack tooth 16 toward a radially inner side. Also, a force $f_2$ is generated on the axially inner surface 42a of the dummy tooth 42 toward an axially inner side at a position of $L_2$ distant from the radially outer end part of the rack tooth 16 positioned at each of both axial ends toward the radially inner side. Also, a force $f_3$ is generated on the axially outer surface 42b of the dummy tooth 42 toward the axially outer side at a position of $L_3$ distant from the radially outer end part of the dummy tooth 42 toward the radially inner side. Herein, since the angles are set so that the relation of $\theta_1 < \theta_2 = \theta_3$ is satisfied, as described above, a relation of $f_1 > f_2 = f_3$ is satisfied by a wedge effect. Also, variation of $0.5 \times H_1 < H_1 - 0.5 \times H_3$ is made due to $H_1 > H_3$, and a relation of $L_1 < L_2$ is satisfied due to $L_1 = 0.5 \times H_1$, $L_3 = 0.5 \times H_3$ and $L_2 = H_1 - L_3$.

Therefore, the moment $L_1 \times f_1$ is generated on the axially outer surface 16b of the rack tooth 16, the moment $L_2 \times f_2$ is generated on the axially inner surface 42a of the dummy tooth 42, and the moment $L_3 \times f_3$ is generated on the axially outer surface 42b of the dummy tooth 42. Herein, since $\theta_2$, $L_2$ ($H_3$) and the like can be freely designed, the moments are designed so that a relation of $L_1 \times f_1 = L_2 \times f_2$ is satisfied.

According to the above configuration, the tooth 39 of the tooth-forming punch 32 configured to form the rack tooth 16 of each of both axial ends and positioned at the axially outer side of the corresponding rack tooth 16 is applied with the moment $L_1 \times f_1$ from the rack tooth 16 of the axially inner side and the moment $L_2 \times f_2$ from the dummy tooth 42 of the axially outer side. Therefore, the moments applied to the tooth 39 of the tooth-forming punch 32 are balanced ($L_1 \times f_1 = L_2 \times f_2$).

Figure 20:
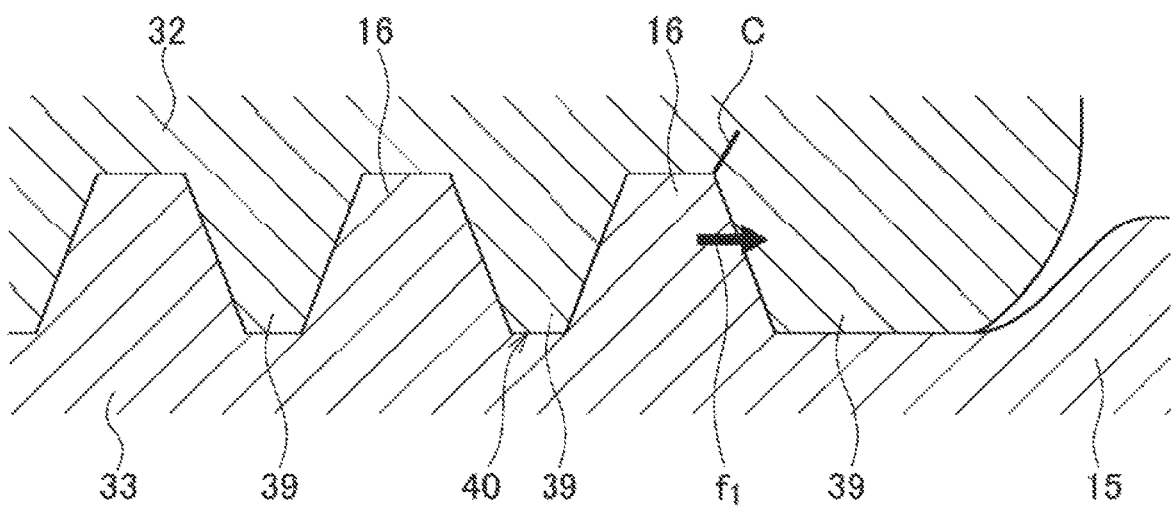
FIG. 20 is an enlarged sectional view corresponding to an area B of FIG. 18.

Also, the tooth 39 of the tooth-forming punch 32 positioned at each of both ends is applied with the moment $L_3 \times f_3$ from the dummy tooth 42 of the axially inner side. The moment $L_3 \times f_3$ is less than the moment $L_1 \times f_1$, which is to be applied to the tooth 39 of the tooth-forming punch 32 when manufacturing the steering rack of the related art (refer to FIG. 20) ($L_3 \times f_3 < L_1 \times f_1$ because $L_3 < L_1$, $f_3 < f_1$). Since the balance of the moments is improved in this way, it is possible to prevent the stress from being concentrated on the teeth 39, thereby implementing the long lifetime of the tooth-forming punch 32.

Further, since the radially outer surface 42c and the pair of connection parts 42d of the dummy tooth 42 have the R shape, the stress concentration on the roots of the teeth 39 of the tooth-forming punch 32 in contact with the connection parts 42d is relieved, so that it is possible to implement the additional long lifetime of the tooth-forming punch 32.

Figure 2:
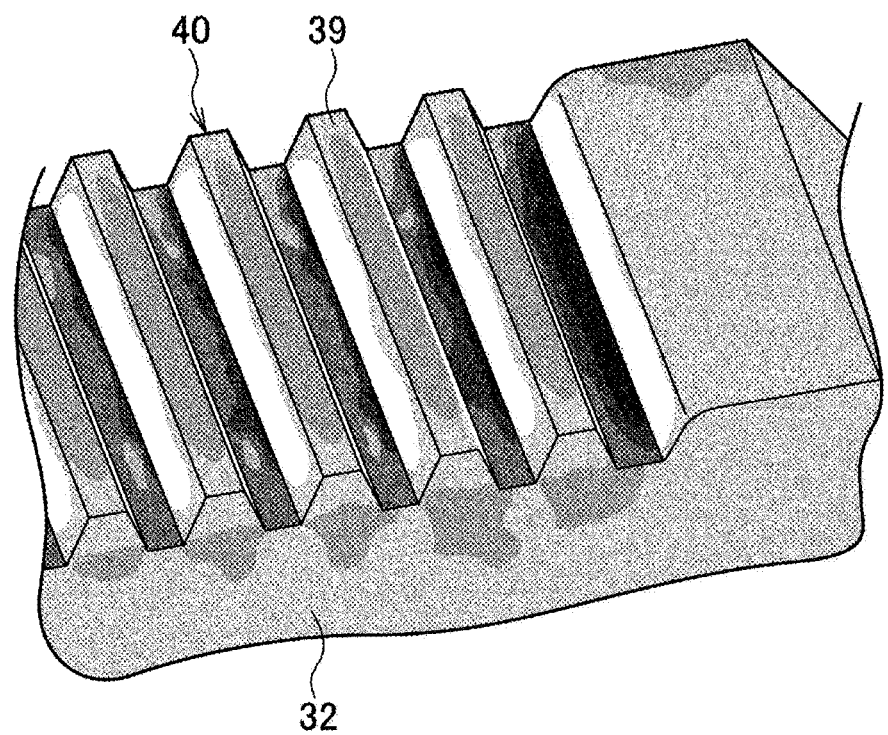
FIG. 2 depicts a stress distribution that is to occur in a tooth-forming punch of the related art.
Figure 3:
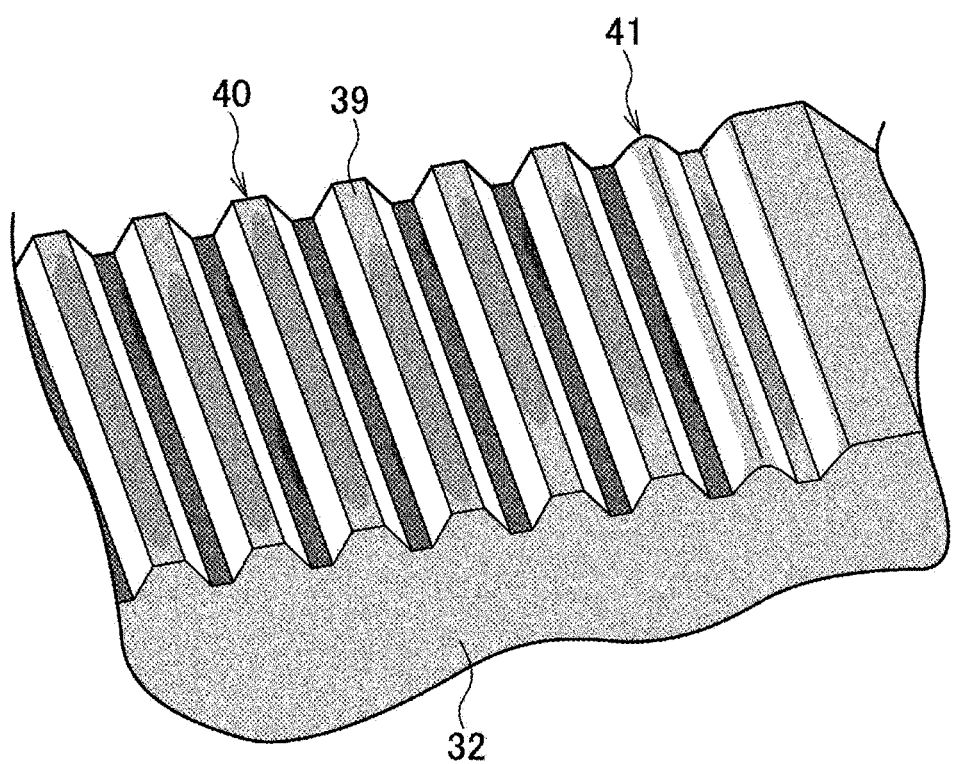
FIG. 3 depicts a stress distribution that is to occur in a tooth-forming punch of the present invention.

The reduction in the tensile stress, which is to be generated on the roots of the teeth 39 of the tooth-forming punch 32, by the dummy tooth 42 is also clear from evaluation results of an elastic-plastic analysis shown in FIGS. 2 and 3. FIG. 2 depicts the tooth-forming punch 32 (corresponding to the tooth-forming punch 32 of FIG. 18) where the dummy tooth processing concave and convex 41 is not provided like the related art, and FIG. 3 depicts the tooth-forming punch 32 of the first embodiment. In FIGS. 2 and 3, the dark part indicates that the tensile stress is high. It can be seen that the considerably high stress is generated at the roots of the teeth 39 of both axial ends of the tooth-forming punch 32 of the related art but the stress to be generated at the roots of the teeth 39 is remarkably reduced in the tooth-forming punch 32 of the first embodiment.

Figure 4:
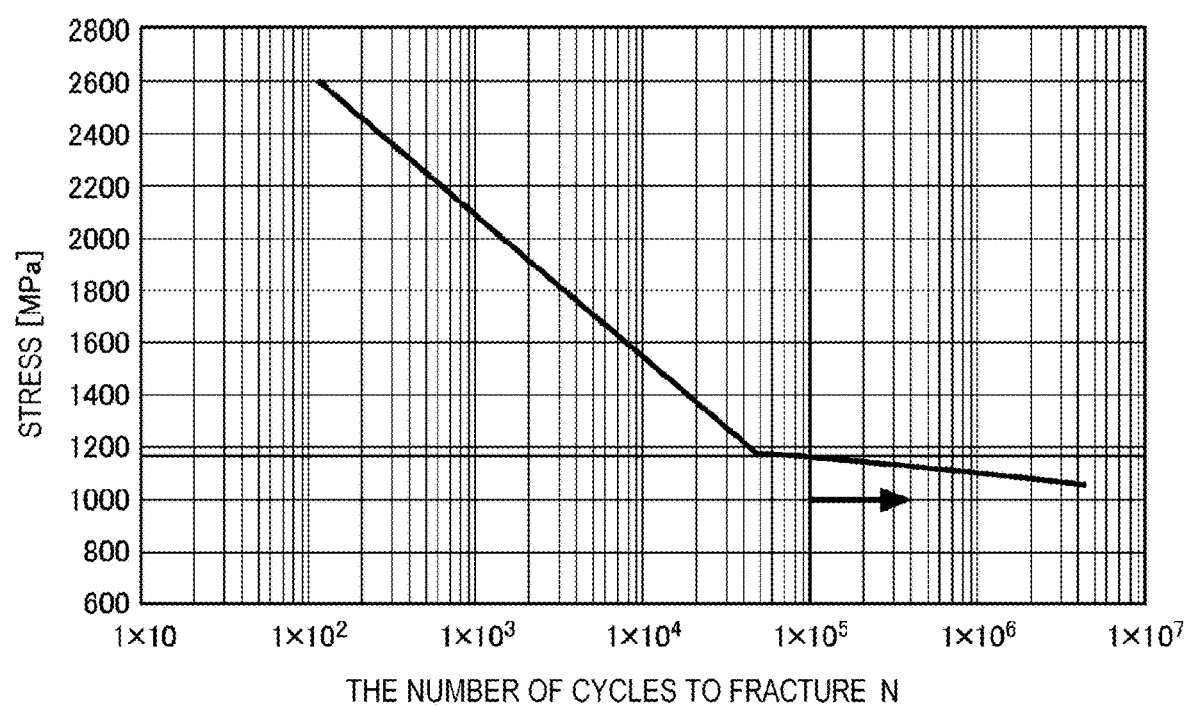
FIG. 4 is an SN diagram of a lifetime of the tooth-forming punch of the present invention.

Also, FIG. 4 depicts an SN diagram of the lifetime of the tooth-forming punch 32. Since the stress to be generated at the roots of the teeth 39 is remarkably reduced in the tooth-forming punch 32 of the first embodiment, as compared to the tooth-forming punch 32 of the related art, the number of cycles to fracture considerably increases and the long lifetime can be thus implemented.

Second Embodiment

In the first embodiment, the dummy tooth 42 is formed one by one at the part that are the part of the rod part 15 in the axial direction and are adjacent to both axial sides of the plurality of rack teeth 16 (refer to FIG. 1). However, as shown in FIG. 5, a plurality of dummy teeth 42 may be formed at a part that is the part of the rod part 15 in the axial direction and is adjacent to each of both axial sides of the plurality of rack teeth 16.

Figure 5:
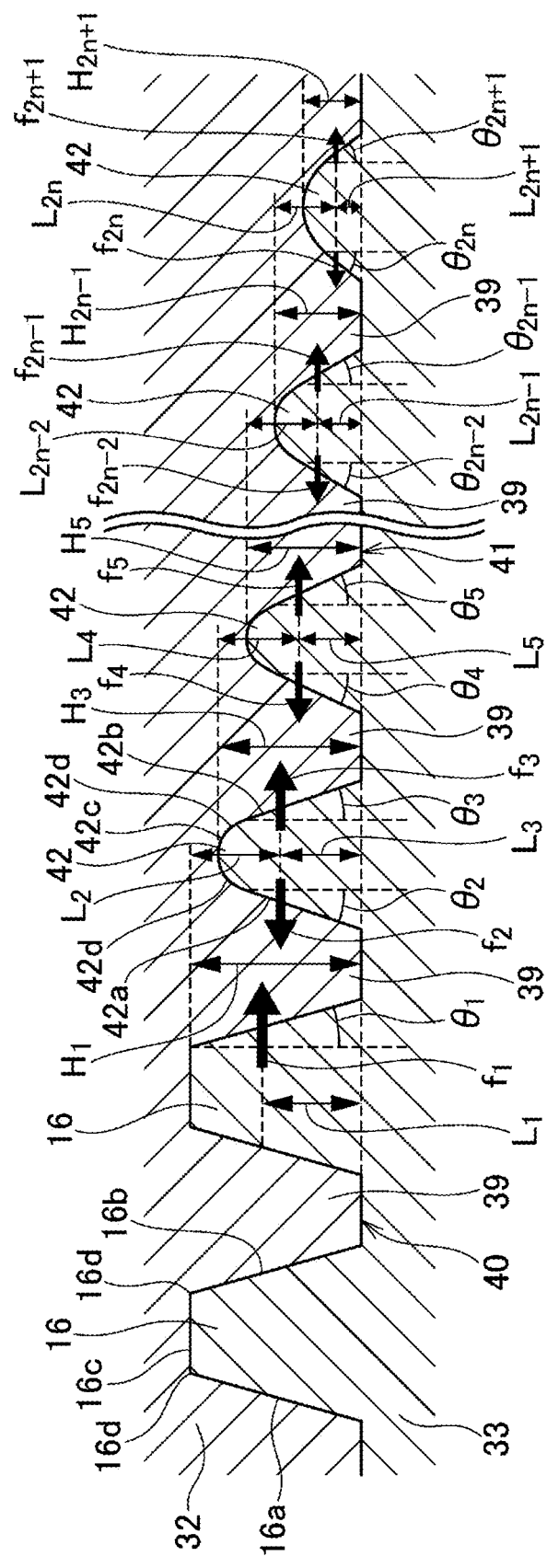
FIG. 5 depicts a rack and a tooth-forming punch according to a second embodiment of the present invention.

In FIG. 5, the n (n: natural number of 2 or greater) dummy teeth 42 are formed at one side in the axial direction. When inclined angles of the axially inner surfaces 42a of the plurality of dummy teeth 42 are denoted as $\theta_2, \theta_4, \ldots, \theta_{2n-2}, \theta_{2n}$ in order from first to $n^{th}$ dummy teeth 42 close to the rack tooth 16, and inclined angles of the axially outer surfaces 42b of the plurality of dummy teeth 42 are denoted as $\theta_3, \theta_5, \ldots, \theta_{2n-1}, \theta_{2n+1}$ in order from the first to $n^{th}$ dummy teeth 42 close to the rack tooth 16, the inclined angles are set so that a relation of $\theta_1 < \theta_2 = \theta_3 < \theta_4 = \theta_5 < \ldots < \theta_{2n-2} = \theta_{2n-1} < \theta_{2n} = \theta_{2n+1}$ is satisfied. Also, when tooth heights of the plurality of dummy teeth 42 are denoted as $H_3, H_5, \ldots, H_{2n-1}, H_{2n+1}$ in order from the first to $n^{th}$ dummy teeth 42, the tooth heights are set so that a relation of $H_1 > H_3 > H_5 > \ldots > H_{2n-1} > H_{2n+1}$ is satisfied. Also, half values of the tooth heights $H_3, H_5, \ldots, H_{2/1-1}, H_{2n+1}$ of the dummy teeth 42 are denoted as $L_3, L_5, \ldots, L_{2n-1}, L_{2n+1}$, and $L_2 = H_1 - L_3$, $L_4 = H_3 - L_5, \ldots, L_{2n} = H_{2n-1} - L_{2n+1}$ are denoted.

In this case, a force $f_1$ is generated on the axially outer surface 16b of the rack tooth 16 positioned at each of both axial ends toward an axially outer side at a position of $L_1$ distant from a radially outer end portion of the corresponding rack tooth 16 toward a radially inner side. Also, a force $f_2$ is generated on the axially inner surface 42a of the dummy tooth 42 toward an axially inner side at a position of $L_2$ distant from the radially outer end portion of the rack tooth 16 positioned at each of both axial ends toward the radially inner side. Also, a force $f_3$ is generated on the axially outer surface 42b of the first dummy tooth 42 toward the axially outer side at a position of $L_3$ distant from the radially outer end portion of the first dummy tooth 42 toward the radially inner side. Also, a force $f_4$ is generated on the axially inner surface 42a of the second dummy tooth 42 toward the axially inner side at a position of $L_4$ distant from the radially outer end portion of the first dummy tooth 42 toward the radially inner side. Also, a force $f_5$ is generated on the axially outer surface 42b of the second dummy tooth 42 toward the axially outer side at a position of $L_5$ distant from the radially outer end portion of the second dummy tooth 42 toward the radially outer side. Also, a force $f_{2n-2}$ is generated on the axially inner surface 42a of the $(n-1)^{th}$ dummy tooth 42 toward the axially inner side at a position of $L_{2n-2}$ distant from the radially outer end portion of the $(n-2)^{th}$ dummy tooth 42 (not shown) toward the radially inner side. Also, a force $f_{2n-1}$ is generated on the axially outer surface 42b of the $(n-1)^{th}$ dummy tooth 42 toward the axially outer side at a position of $L_{2n-1}$ distant from the radially outer end portion of the $(n-1)^{th}$ dummy tooth 42 toward the radially inner side. Also, a force $f_{2n}$ is generated on the axially inner surface 42a of the $n^{th}$ dummy tooth 42 toward the axially inner side at a position of $L_{2n}$ distant from the radially outer end portion of the $(n-1)^{th}$ dummy tooth 42 toward the radially outer side. Also, a force $f_{2n+1}$ is generated on the axially outer surface 42b of the $n^{th}$ dummy tooth 42 toward the axially outer side at a position of $L_{2n+1}$ distant from the radially outer end portion of the $n^{th}$ dummy tooth 42 toward the radially inner side.

Herein, since the inclined angles are set so that the relation of $\theta_1<\theta_2=\theta_3<\theta_4=\theta_5<\ldots<\theta_{2n-2}=\theta_{2n-1}<\theta_{2n}=\theta_{2n+1}$ is satisfied, as described above, a relation of $f_1>f_2=f_3>f_4=f_5>\ldots>f_{2n-2}=f_{2n-1}>f_{2n}=f_{2n+1}$ is satisfied by a wedge effect. Also, a relation of $L_1<L_2, L_3<L_4, \ldots, L_{2n-1}<L_{2n}$ is satisfied due to $H_1>H_3>H_5>\ldots>H_{2n-1}>H_{2n+1}$.

Therefore, the moment $L_1\times f_1$ is generated on the axially outer surface 16b of the rack tooth 16, the moment $L_2\times f_2$ is generated on the axially inner surface 42a of the first dummy tooth 42, the moment $L_3\times f_3$ is generated on the axially outer surface 42b of the first dummy tooth 42, the moment $L_4\times f_4$ is generated on the axially inner surface 42a of the second dummy tooth 42, the moment $L_{2n-1}\times f_{2n-1}$ is generated on the axially outer surface 42b of the $(n-1)^{th}$ dummy tooth 42, and the moment $L_{2n}\times f_{2n}$ is generated on the axially inner surface 42a of the $n^{th}$ dummy tooth 42. Herein, the moments are designed so that $L_1\times f_1=L_2\times f_2$, $L_3\times f_3=L_4\times f_4$ and $L_{2n-1}\times f_{2n-1}=L_{2n}\times f_{2n}$ and the moments from the left and right are balanced.

According to the above configuration, the tooth 39 of the tooth-forming punch 32 configured to form the rack tooth 16 at each of both ends in the axial direction and positioned at the axially outer side of the corresponding rack tooth 16 is applied with the moment $L_1\times f_1$ from the rack tooth 16 of the axially inner side and the moment $L_2\times f_2$ from the dummy tooth 42 of the axially outer side. Also, the tooth 39 (the second tooth 39) adjacent to the axially outer side of the tooth 39 is applied with the moment $L_3\times f_3$ from the first dummy tooth 42 of the axially inner side and the moment $L_4\times f_4$ from the second dummy tooth 42 of the axially outer side. Also, the $n^{th}$ tooth 39 is applied with the moment $L_{2n-1}\times f_{2n-1}$ from the $(n-1)^{th}$ dummy tooth 42 and the moment $L_{2n}\times f_{2n}$ from the $n^{th}$ dummy tooth 42 of the axially outer side. Therefore, the moments that are to be applied to the plurality of teeth 39 of the tooth-forming punch 32 are balanced ($L_1\times f_1=L_2\times f_2$, $L_3\times f_3=L_4\times f_4$, $L_{2n-1}\times f_{2n-1}=L_{2n}\times f_{2n}$).

Also, the tooth 39 of the tooth-forming punch 32 positioned at each of both ends is applied with the moment $L_{2n+1}\times f_{2n+1}$ from the dummy tooth 42 of the axially inner side. However, the moment $L_{2n+1}\times f_{2n+1}$ is less than the moment $L_3\times f_3$, which is to be applied to the tooth 39 of the tooth-forming punch 32 positioned at each of both ends in the first embodiment ($L_{2n+1}\times f_{2n+1}<L_3\times f_3$ because $L_{2n+1}<L_3$, $f_{2n+1}<f_3$). Since the balance of the moments is improved in this way, as compared to the first embodiment, it is possible to prevent the stress from being concentrated on the teeth 39, thereby implementing the long lifetime of the tooth-forming punch 32.

In the meantime, the present invention is not limited to the respective embodiments and can be appropriately changed and modified.

Figure 6:
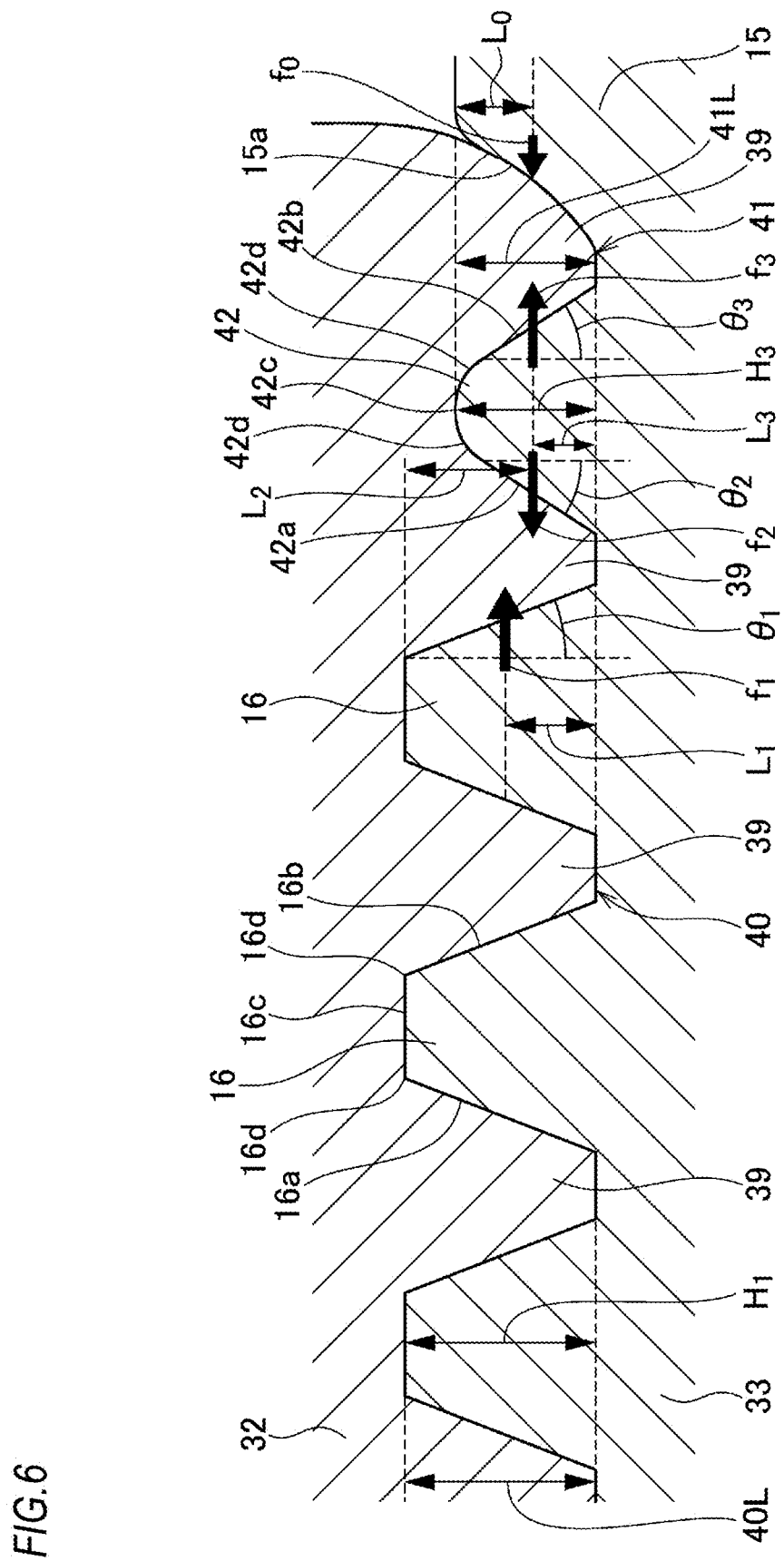
FIG. 6 depicts a rack and a tooth-forming punch according to a modified embodiment.

For example, in the first embodiment (refer to FIG. 1), the tooth 39 of the tooth-forming punch 32 positioned at each of both end parts is applied with the moment $L_3\times f_3$ from the dummy tooth 42 of the axially inner side and is not applied with the moment from the rod part 15 of the axially outer side. However, the present invention is not limited to the corresponding configuration. For example, as shown in FIG. 6, the moment may be applied from the rod part 15 of the axially outer side.

In this case, the tooth 39 of the tooth-forming punch 32 positioned at each of both end parts and the rod part 15 are axially contacted to each other. Also, a force $f_0$ is generated on the axially inner surface 15a of the rod part 15 toward the axially inner side at a position of $L_0$ distant from the radially outer end portion of the dummy tooth 42 positioned at each of both ends toward the radially inner side. Also, the moment $L_0\times f_0$ is generated on the axially inner surface 15a of the rod part 15. Meanwhile, in the shown example, $L_0$ is an arbitrary value satisfying a relation of $0<L_0<H_3$.

Therefore, the tooth 39 of the tooth-forming punch 32 positioned at each of both end parts is applied with the moment $L_3\times f_3$ from the dummy tooth 42 of the axially inner side and the moment $L_0\times f_0$ from the rod part 15 of the axially outer side. Therefore, since the balance of the moments is improved, as compared to the moment $L_3\times f_3$ that is to be applied to the teeth 39 of both ends of the tooth-forming punch 32 in the first embodiment, it is possible to prevent the stress from being concentrated on the teeth 39, thereby implementing the long lifetime of the tooth-forming punch 32. This configuration is particularly efficient when it is difficult to increase the number of the dummy teeth 42.

In the meantime, also in the second embodiment, the tooth 39 of the tooth-forming punch 32 positioned at each of both end parts may be applied with the moment $L_{2n+1}\times f_{2n+1}$ from the dummy tooth 42 of the axially inner side and the moment $L_0\times f_0$ from the rod part 15 of the axially outer side.

Also, in the above embodiments, the inclined angles $\theta_2, \theta_4, \ldots, \theta_{2n}$ of the axially inner surfaces 42a of the plurality of dummy teeth 42 and the inclined angles $\theta_3, \theta_5, \ldots, \theta_{2n+1}$ of the axially outer surfaces 42b are the same ($\theta_2=\theta_3<\theta_4=\theta_5<\ldots<\theta_{2n-2}=\theta_{2n-1}<\theta_{2n}=\theta_{2n+1}$). However, the inclined angles are not necessarily required to be the same. In this case, the inclined angles are set so that at least a relation of $\theta_1<\theta_2\leq\theta_3<\theta_4\leq\theta_5<\ldots<\theta_{2n-2}\leq\theta_{2n-1}<\theta_{2n}\leq\theta_{2n+1}$ is satisfied.

Figure 7:
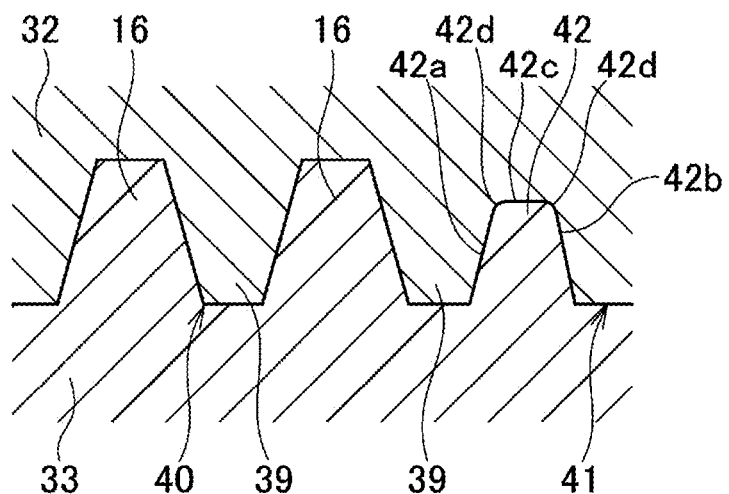
FIG. 7 depicts a rack and a tooth-forming punch according to a modified embodiment.

Also, the radially outer surface 42c of the dummy tooth 42 is not necessarily required to have the curved surface of R-shaped cross section of which the axially intermediate part is convex. For example, as shown in FIG. 7, the radially outer surface 42c of the dummy tooth 42 may have a planar cross section. Also in this configuration, when the pair of connection parts 42d consisting of the axially inner surface 42a and axially outer surface 42b and the radially outer surface 42c is formed to have an R shape, it is possible to relieve the stress concentration on the roots of the teeth 39 of the tooth-forming punch 32 in contact with the connection parts 42d.

Figure 8:
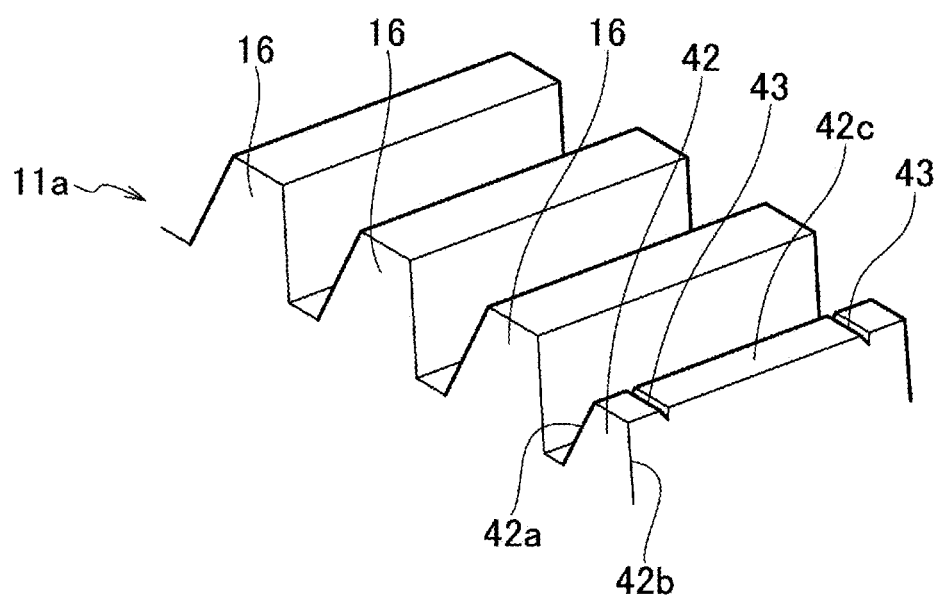
FIG. 8 is a perspective view depicting a rack according to a modified embodiment.

Also, as shown in FIG. 8, the radially outer surface 42*c* of the at least one dummy tooth 42 is preferably formed with at least one groove portion 43. FIG. 8 depicts an example where a pair of groove portions 43 is formed adjacent to both ends in a width direction of the radially outer surface 42*c* of the dummy tooth 42, in the first embodiment where the dummy tooth 42 is formed one by one at the parts that are adjacent to both axial sides of the rack teeth 16. The pair of groove portions 43 has a substantially linear shape axially extending and enabling the axially inner surface 42*a* and the axially outer surface 42*b* to communicate with each other. Also, the groove portion 43 has a width size of about 0.5 to 1.0 mm and a depth size of about 0.5 to 1.0 mm. In the meantime, since the dummy tooth 42 is configured not to mesh with the pinion, as described above, there is no problem even when the groove portion 43 is provided on the radially outer surface 42*c* which is a tooth end.

In this way, when the radially outer surface 42*c* of the at least one dummy tooth 42 is formed with the at least one groove portion 43, it is possible to use the groove portion 43 as a reference when positioning the steering rack 11*a* in a post process after the forging. For example, the positioning is performed by operating a probe having the same shape as the groove portion 43 toward the groove portion 43 and engaging the same with the groove portion 43. Particularly, in this example, each of the pair of dummy teeth 42 provided at the parts adjacent to both axial sides of the rack teeth 16 (in FIG. 8, only one axial dummy tooth 42 is shown) is provided with the pair of groove portions 43, so that a total of four groove portions 43 are provided. Therefore, the four probes are engaged with the four groove portions for positioning, so that the positioning can be made with higher precision.

Also, in FIG. 8, the pair of dummy teeth 42 provided at the portions adjacent to both axial sides of the rack teeth 16 has the same tooth height. Therefore, it is possible to level the steering rack 11*a* by engaging the four probes with the four groove portions 43 to detect positions of the respective groove portions 43 and confirming that the horizontal positions of the at least three groove portions 43 are the same. Therefore, for the leveling, it is necessary to form a total of three or more groove portions 43 on the plurality of dummy teeth 42 having the same tooth height.

In order to form the groove portion 43, the dummy tooth processing concave and convex 41 of the tooth-forming punch 32 (refer to FIG. 1 and the like) is formed with a protrusion (not shown) having a shape corresponding to the groove portion 43. According to this configuration, since the tooth-forming punch 32 has the rack tooth processing concave and convex 40, the dummy tooth processing concave and convex 41 and the protrusion, it is possible to form the rack teeth 16, the dummy tooth 42 and the groove portion 43 on the steering rack 11*a* at the same time. Therefore, since it is not necessary to process the groove portion 43 in a separate process, it is possible to prevent increases in the working hours and costs.

Meanwhile, in FIG. 8, the groove portions 43 are provided on the dummy teeth 42 of the first embodiment. However, also in the second embodiment (refer to FIG. 5) where the plurality of dummy teeth 42 is provided at the parts adjacent to both axial sides of the rack teeth 16, the groove portions 43 may be provided on the dummy teeth 42. In this case, when the radially outer surface 42*c* of the at least one dummy tooth 42 is formed with the at least one groove portion 43, the positioning of the steering rack 11*a* can be performed. Also, when a total of three or more groove portions 43 are formed on the plurality of dummy teeth 42 having the same tooth height, the leveling is possible.

Figure 9:
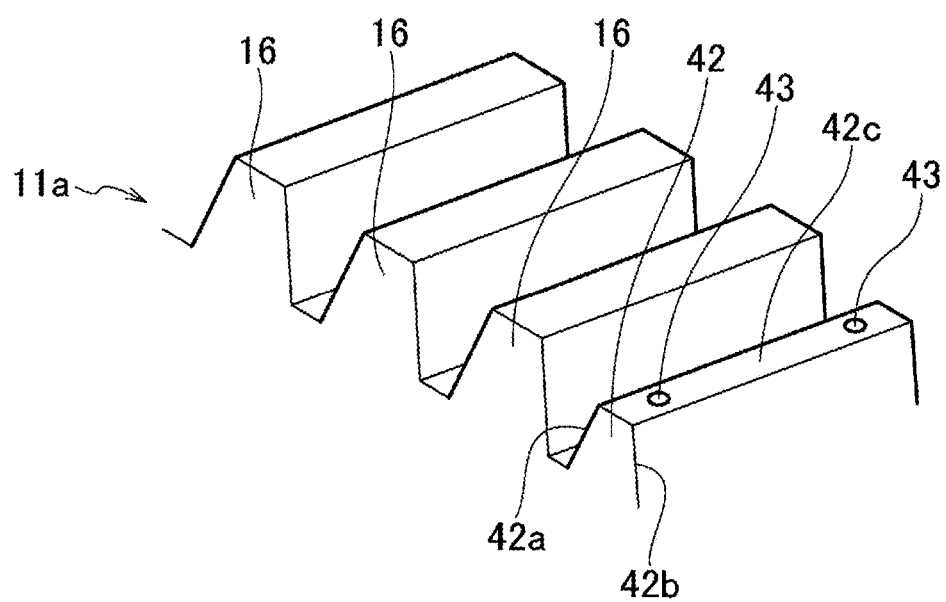
FIG. 9 is a perspective view depicting a rack according to a modified embodiment.
Figure 10:
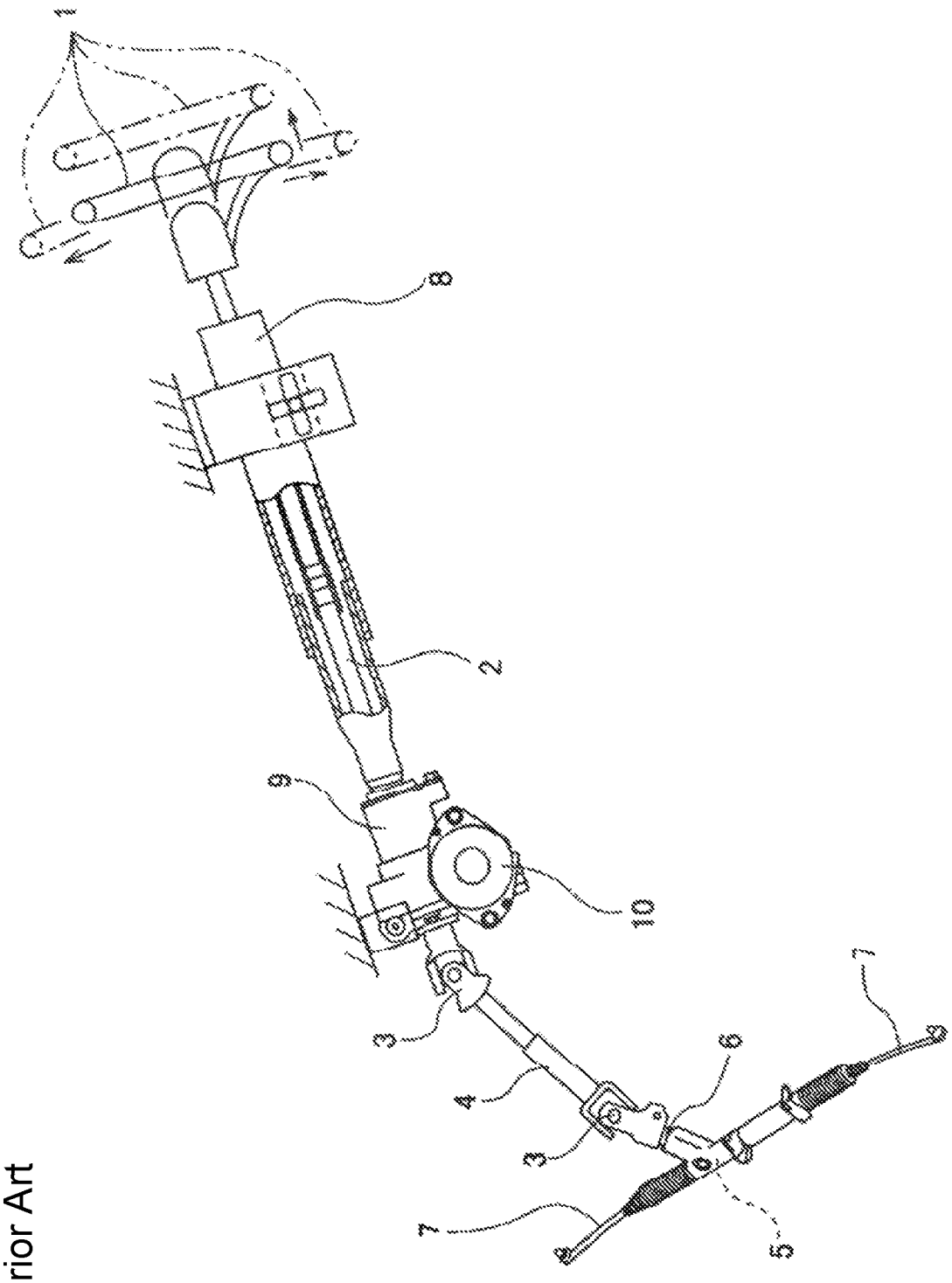
FIG. 10 is a partially sectional view depicting a first example of the conventional structure of an automotive steering device having a steering gear in which a steering rack is incorporated.
Figure 11:
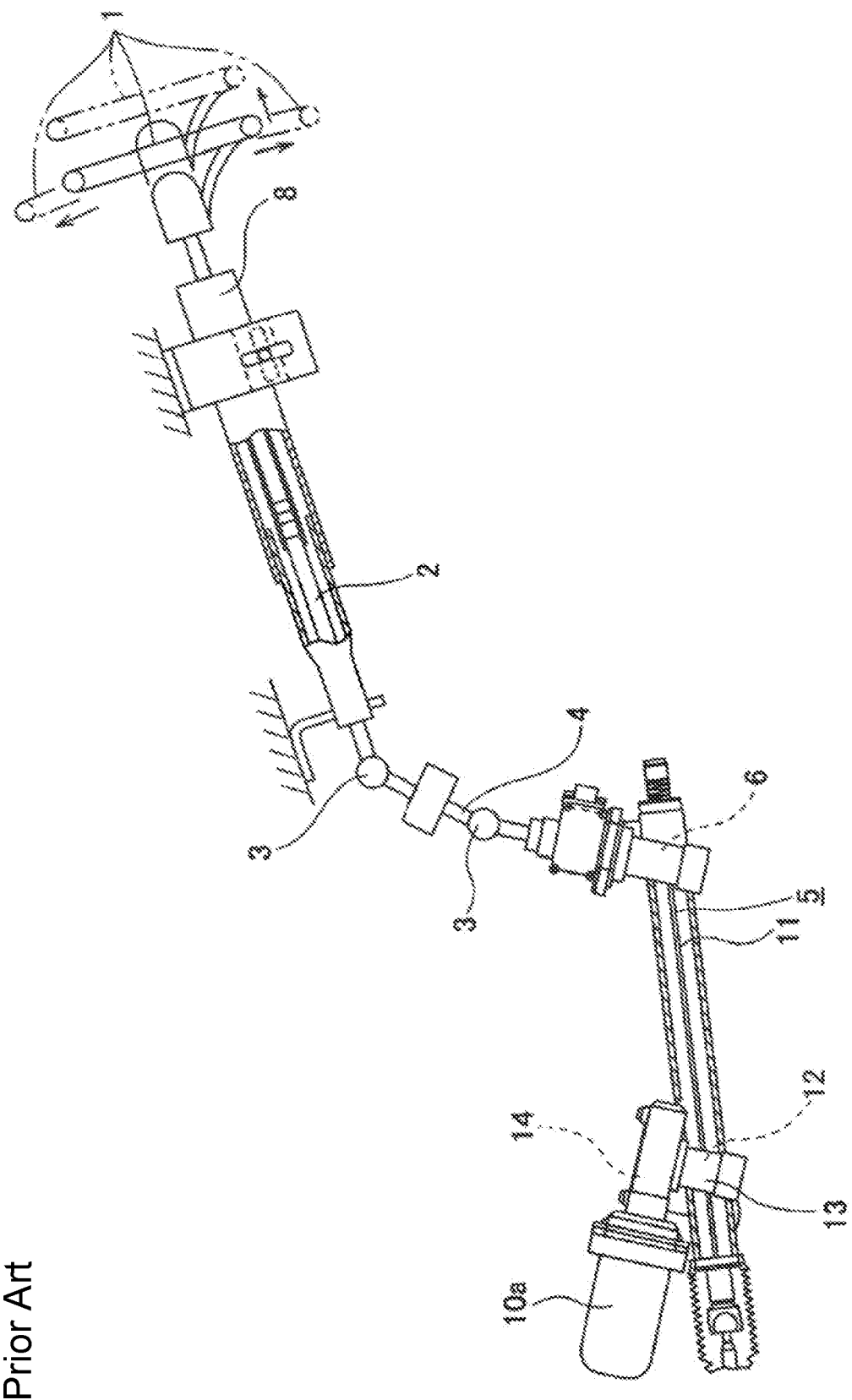
FIG. 11 is a partially sectional view depicting a second example of the conventional structure of an automotive steering device having a steering gear in which a steering rack is incorporated.
Figure 12:
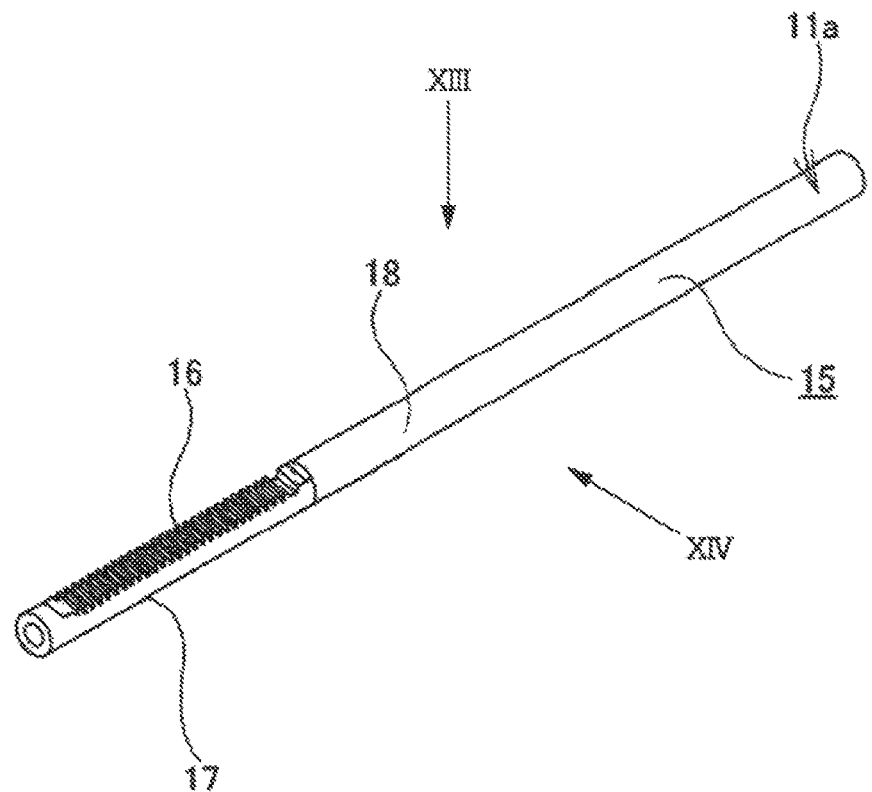
FIG. 12 is a perspective view depicting the steering rack.
Figure 13:
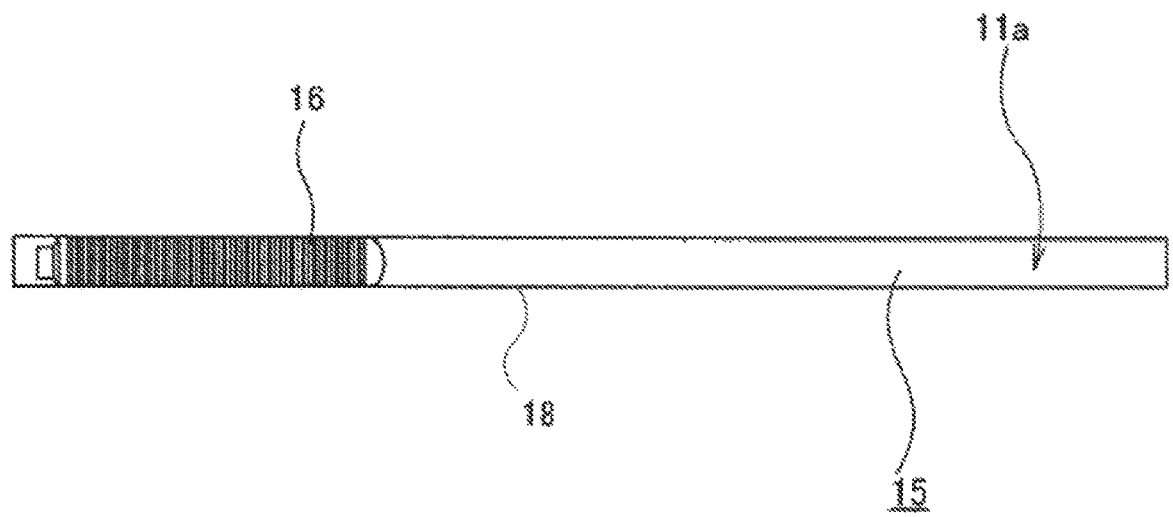
FIG. 13 is a view, as seen from a XIII arrow direction of FIG. 12.
Figure 14:
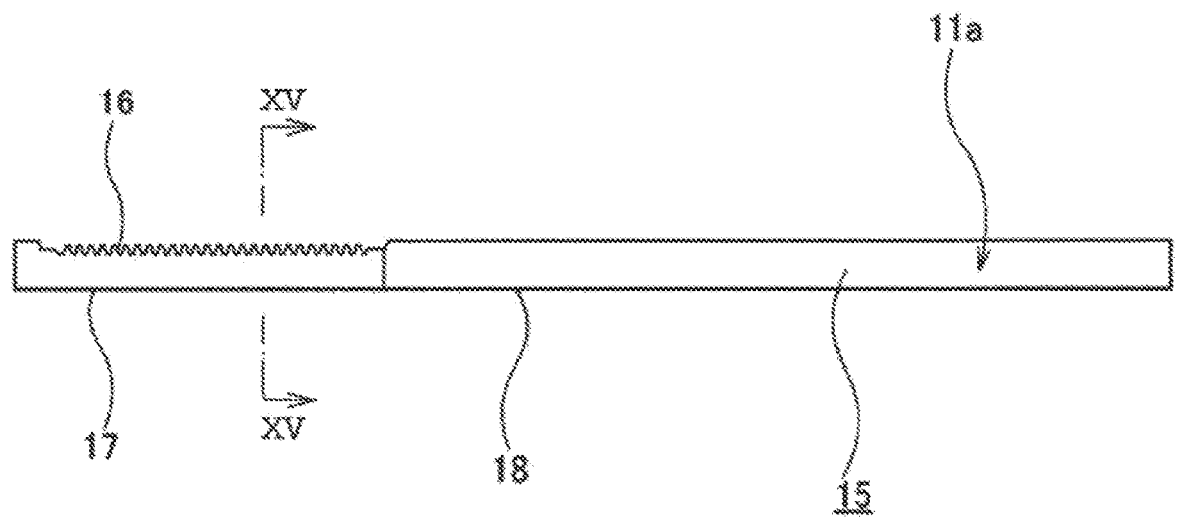
FIG. 14 is a view, as seen from a XIV arrow direction of FIG. 12.
Figure 15:
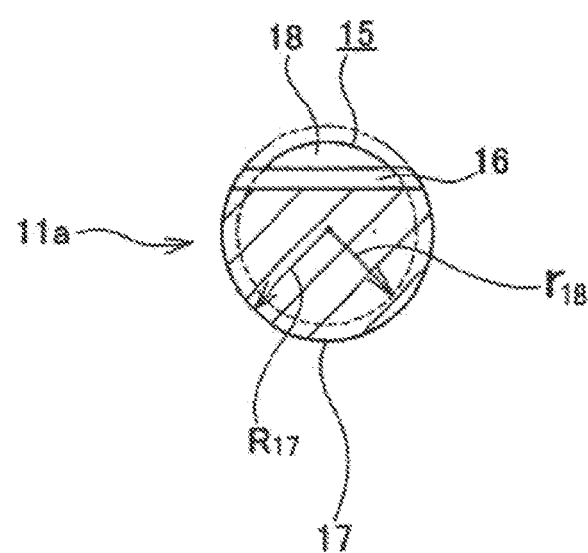
FIG. 15 is a sectional view taken along a line XV-XV of FIG. 14.

The shape of the groove portion 43 is not particularly limited inasmuch as it can be used as a reference of the positioning or leveling of the steering rack 11*a*. For example, a substantially semispherical shape as shown in FIG. 9 is also possible. In this case, the groove portion 43 has a diameter size of about 0.5 to 1.0 mm and a depth size of about 0.5 to 1.0 mm.

The subject application is based on a Japanese Patent Application No. 2014-009670 filed on Jan. 22, 2014, which is herein incorporated for reference.

DESCRIPTION OF REFERENCE NUMERALS

1: steering wheel, 2: steering shaft, 3: universal joint, 4: intermediate shaft, 5: steering gear, 6: input shaft, 7: tie-rod, 8: steering column, 9: gear housing, 10, 10*a*: electric motor, 11, 11*a*: steering rack, 12: second input shaft, 13: housing, 14: decelerator, 15: rod part, 15*a*: axially inner surface, 16: rack tooth, 16*a*: axially inner surface, 16*b*: axially outer surface, 16*c*: radially outer surface, 16*d*: connection part, 17: backside part, 18: cylindrical part, 19: material, 20: receiving die, 21: concave groove portion, 22: pressing punch, 23: intermediate material, 24: partially cylindrical surface part, 25: flat surface part, 26: curved surface part, 27: die, 28: holding hole, 29: bottom, 30: inner surface, 31: inclined guide surface portion, 32: tooth-forming punch, 33: base rack, 34: relief flat surface part, 35: sizing die, 36: sizing concave and convex surface part, 37: press die, 38: pressing concave groove, 39: tooth, 40: rack tooth processing concave and convex, 40L: tooth height, 41: dummy tooth processing concave and convex, 41L: tooth height, 42: dummy tooth, 42L: tooth height, 42*a*: axially inner surface, 42*b*: axially outer surface, 42*c*: radially outer surface, 42*d*: connection part, 43: groove portion, A, B: area, C: crack, $R_{17}$, $r_{18}$: radius of curvature

The invention claimed is:

1. A method of manufacturing a steering rack, the method comprising:

forming a plurality of rack teeth on a radial one side surface of a part of a rod part, which is extending in an axial direction and is made of a metal material, in the axial direction by pressing a tooth- forming punch having rack tooth processing concave and convex, the tooth-forming punch having a rack shape toward the radial one side surface, and plastically deforming the radial one side surface of the part of the rod part, wherein the plurality of rack is configured to mesh with a pinion configured to be rotationally driven by an input shaft of a steering gear configuring an automotive steering device, the tooth-forming punch having dummy tooth processing concave and convex of which a tooth height is less than the rack tooth processing concave and convex at parts adjacent to both axial sides of the rack tooth processing concave and convex, at least one dummy tooth having a tooth height less than the rack teeth and configured not to mesh with the pinion is formed at parts that are parts of the rod part in the axial direction and are adjacent to both axial sides of the plurality of rack teeth, in the process of forming the rack teeth, axially outer surfaces of teeth positioned at end parts of the tooth-forming punch in the axial direction are contacted to axially inner surfaces of the rod part, the dummy tooth processing concave and convex has at least one protrusion, and a radially outer surface of the at least one dummy tooth is formed with at least one groove portion on the at least one protrusion, the groove portion being one of a groove portion extending transversely to a width of the tooth-forming punch and a substantially semispherical groove portion with a diameter and a depth into the at least one protrusion.

\* \* \* \* \*